United States Patent
Wang

(10) Patent No.: US 8,072,744 B2
(45) Date of Patent: Dec. 6, 2011

(54) PORTABLE ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 137 days.

(21) Appl. No.: 12/548,613

(22) Filed: Aug. 27, 2009

(65) Prior Publication Data

US 2010/0165553 A1    Jul. 1, 2010

(30) Foreign Application Priority Data

Dec. 31, 2008   (CN) .......................... 2008 1 0306734

(51) Int. Cl.
   *G06F 1/16* (2006.01)
(52) U.S. Cl. ......... 361/679.29; 361/679.55; 361/679.57; 312/223.2; 248/371; 248/398
(58) Field of Classification Search ............... 361/679.59
   See application file for complete search history.

(56) References Cited

U.S. PATENT DOCUMENTS

| | | | | |
|---|---|---|---|---|
| D305,883 | S * | 2/1990 | Burton | D14/324 |
| 5,642,258 | A * | 6/1997 | Barrus et al. | 361/679.59 |
| 6,115,883 | A * | 9/2000 | Um | 16/405 |
| 6,636,420 | B2 * | 10/2003 | Nakano et al. | 361/679.27 |
| 7,206,198 | B2 * | 4/2007 | Wang | 361/679.55 |
| 7,576,981 | B2 * | 8/2009 | Kuo | 361/679.59 |
| 7,612,998 | B2 * | 11/2009 | Fan et al. | 361/679.59 |
| 7,916,478 | B2 * | 3/2011 | Tu et al. | 361/679.59 |
| 2010/0177467 | A1 * | 7/2010 | Wang | 361/679.01 |

FOREIGN PATENT DOCUMENTS

CN       2731520 Y    10/2005

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A portable electronic device includes a main body, a handle, two anti-rotation members, and a connecting member rotatably connecting the main body to the handle. The anti-rotation members are fixed to two ends of the connecting member. The main body defines two receiving grooves. An anti-rotation hole is defined in a side wall of each receiving groove. The handle includes a rod portion and two supporting portions extending from opposite ends of the rod portion. An engaging groove is defined in each supporting portion. An end of the supporting portions of the handle is received in the receiving grooves. The anti-rotation members are detachably latched in the engaging grooves of the handle and the anti-rotation holes of the main body such that the handle and the main body are non-rotatable relative to the connecting member and define an angle.

13 Claims, 6 Drawing Sheets

PORTABLE ELECTRONIC DEVICE

BACKGROUND

1. Technical Field

The present invention relates to a portable electronic device.

2. Description of the Related Art

Generally, a notebook computer includes a main body, a display panel, a hinge assembly connecting the main body to the display panel, and a carrying handle. The carrying handle includes a rod portion and two rotation portions formed on opposite ends of the rod portion. The main body defines two elongated slots to receive the rotation portions of the carrying handle. The rotation portions of the carrying handle are received in the slots of the main body.

When the rotation portions of the carrying handle are at a first end of the slots, the carrying handle can support the main body. When the rotation portions of the carrying handle are at a second end of the slots opposite to the first end of the main body, the carrying handle may be grasped and the notebook computer easily carried.

However, impacts are easily generated on the notebook computer by the rotation portions of the carrying handle freely sliding along the elongated slots of the main body.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
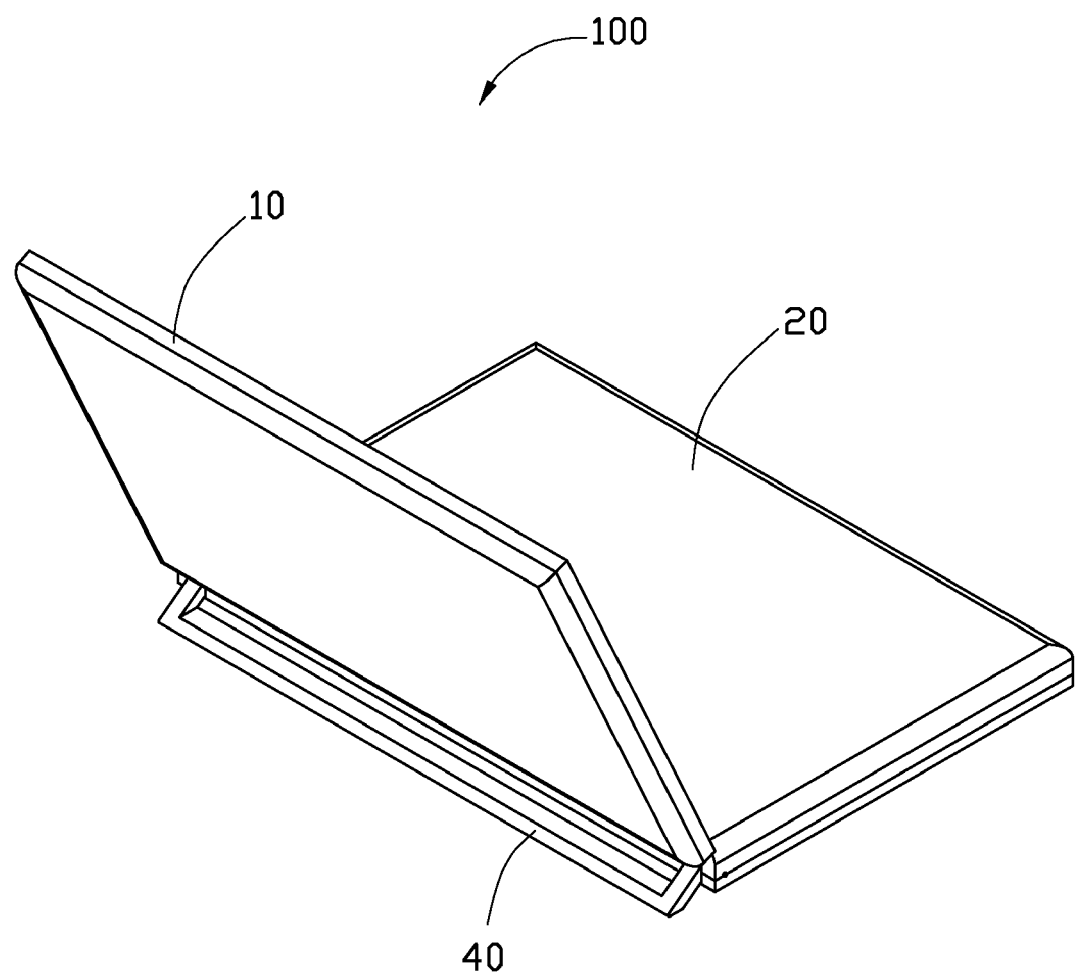
FIG. 1 is an isometric view of an embodiment of a portable electronic device in a first, operational state.

Referring to FIG. 1, a portable electronic device 100 includes a display panel 10, a main body 20, and a handle assembly 40 positioned on the main body 20.

Figure 2:
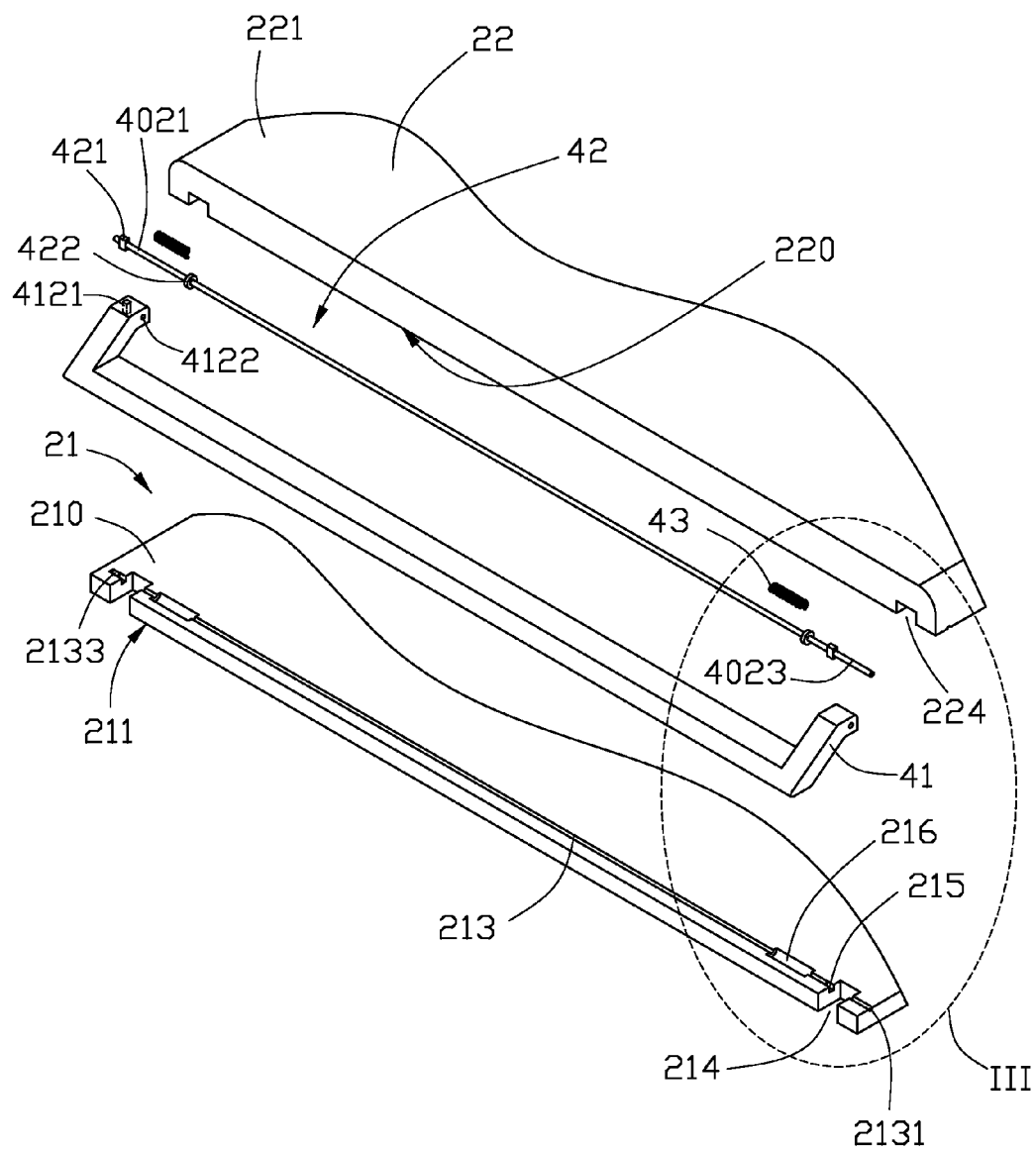
FIG. 2 is a partial, exploded isometric view of the portable electronic device in FIG. 1.
Figure 3:
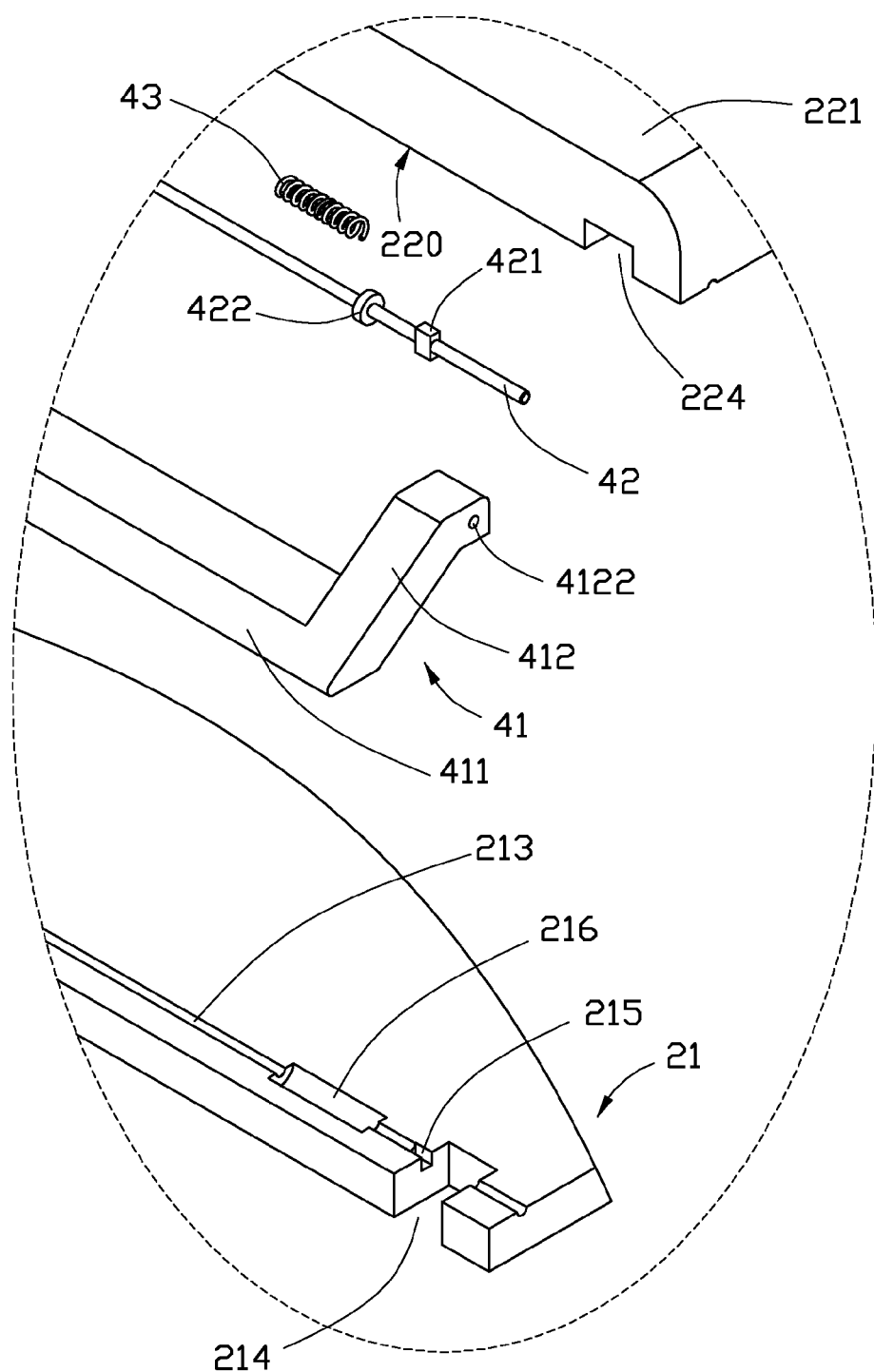
FIG. 3 is an enlarged view of a circled portion III in FIG. 2.

Referring to FIGS. 2 and 3, the main body 20 includes a first base plate 21 and a second base plate 22 positioned on the first base plate 21.

The first base plate 21 includes a top surface 210 and a bottom surface 211 opposite to the top surface 210. The first base plate 21 defines a cylindrical elongated groove 213, two slots 214 crossing the elongated groove 213, and two receiving depressions 216. The elongated groove 213 includes an open end 2131 and a closed end 2133 opposite to the open end 2311.

The slots 214 connect the top surface 210 to the bottom surface 211 and are adjacent to the open end 2131 and the closed end 2133 of the elongated groove 213.

The receiving depressions 216 cross the elongated groove 213 and are adjacent to the two slots 214. The receiving depressions 216 are deeper and wider than the elongated groove 213.

Furthermore, a notch 215 is defined in a sidewall of each slot 214. The two notches 215 are in a side, adjacent to the closed end 2133, of the slots 214. The notches 215 are deeper than the elongated groove 213.

The second base plate 22 differs from the first base plate 21 only in that slots 224 of the second base plate 22 do not connect a top surface 220 to a bottom surface 221. Therefore, after the second base plate 22 is positioned on the first base plate 21, the slots 214 of the first base plate 21 and the slots 224 of the second base plate 22 are capable of defining two receiving grooves (not labeled).

The handle assembly 40 includes a handle 41, a connecting member 42, two elastic members 43, two anti-rotation members 421, and two resisting members 422.

The handle 41 may be substantially U-shaped, and includes an elongated rod portion 411 and two supporting portions 412 extending from opposite ends of the rod portion 411. A through hole 4122 is defined in an end of each supporting portion 412. An engaging groove 4121 is defined in a periphery of each through hole 4122. One engaging groove 4121 is defined in an inner side of one supporting portion 412, and another in an outer side of the other supporting portion 412.

The connecting member 42 includes a first end 4021 and a second end 4023 opposite to the first end 4021 thereof. The anti-rotation members 421 may be substantially rectangular, and the resisting members 422 substantially cylindrical.

During assembly, the connecting member 42 passes through one through hole 4122 of the handle 41, one anti-rotation member 421, one elastic member 43, one resisting member 422, another resisting member 422, another elastic member 43, another through hole 4122 of the handle 41, and another anti-rotation member 421. The anti-rotation members 421 and the resisting members 422 are fixed. Two anti-rotation members 421 are on the first and second end 4021, 4023 of the connecting member 42, and two resisting members 422 are adjacent to the two anti-rotation members 421 such that the resisting members 422 are between the anti-rotation members 421. Each supporting portion 412 is between one corresponding elastic member 43 and one corresponding anti-rotation member 421.

Furthermore, the distance between the resisting member 422 and anti-rotation member 421 adjacent to the first end 4021 of the connecting member 42 exceeds the distance between the resisting member 422 and anti-rotation member 421 adjacent to the second end 4023 of the connecting member 42.

The connecting member 42 is positioned in the elongated groove 213 of the first base plate 21 such that the second end 4023 of the connecting member 42 is in the open end 2131 of the elongated groove 213. The anti-rotation members 421 are received in the slots 214, and the resisting members 422 and the elastic members 43 are received in the receiving depressions 216 of the first base plate 21. Additionally, one end of the elastic members 43 resists the resisting members 422 and another end of the elastic members 43 resists a periphery of the receiving depressions 216 to prevent the anti-rotation members 421 from entering the notches 215 of the first base plate 21.

The supporting portions 412 of the handle 41 are received in the two slots 214 of the first base plate 21 such that the closed end 2133 of the elongated groove 213 is adjacent to the engaging groove 4121 in the outer side of the corresponding supporting portion 412.

The second base plate 22 is positioned on the first base plate 21. The elongated grooves 213 of the first base plate 21 and the second base plate 22 cooperatively form a receiving hole (not labeled) to receive the connecting member 42. The receiving depressions 216 of the first base plate 21 and the second base plate 22 cooperatively form two receiving cavities (not labeled) to receive the resisting members 422. The notches 215 of the first base plate 21 and the second base plate 22 cooperatively form two anti-rotation holes (not labeled) to receive the anti-rotation members 421.

Figure 5:
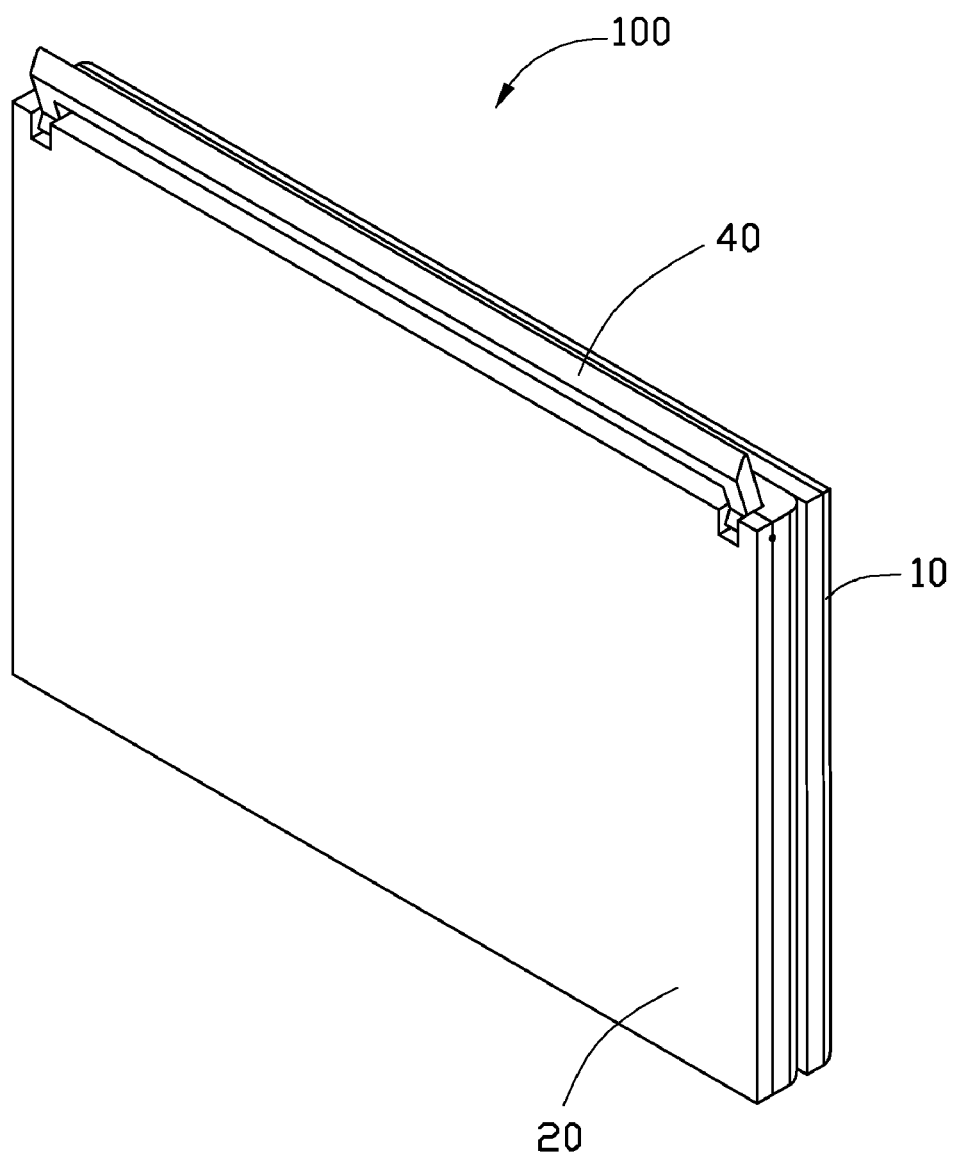
FIG. 5 is an isometric view of the portable electronic device in a second, portable state.
Figure 6:
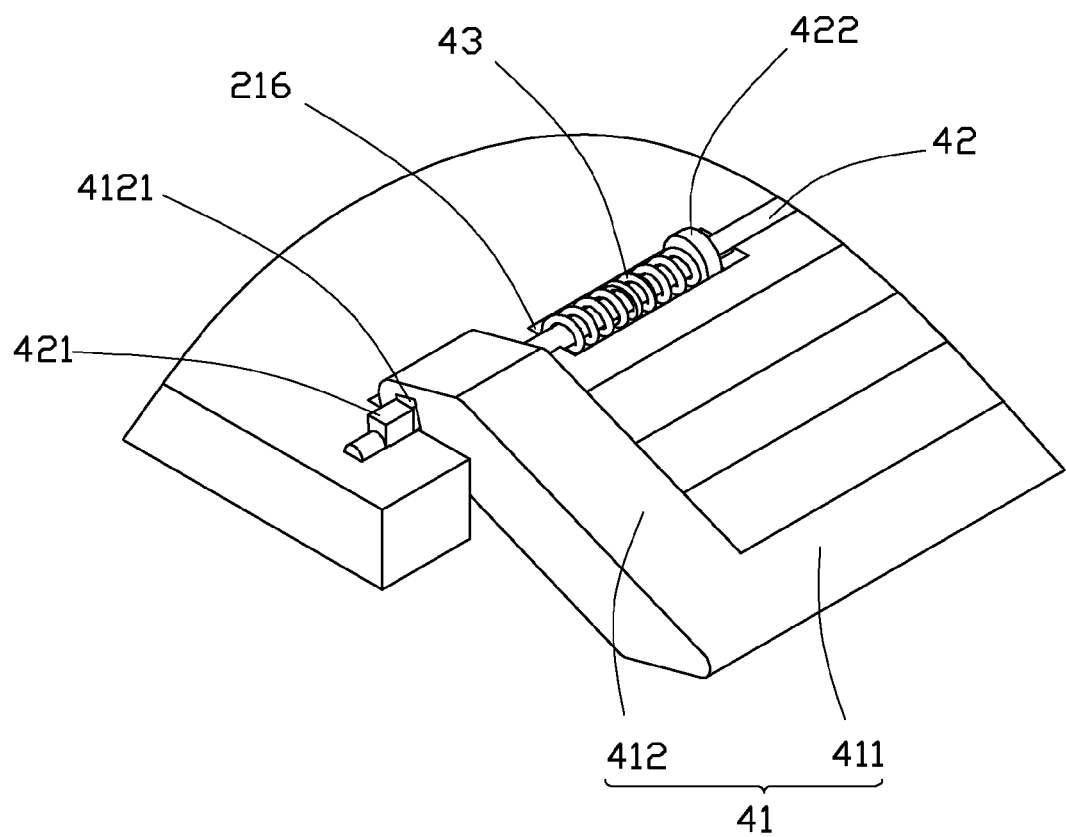
FIG. 6 is a partially enlarged view of the portable electronic device in FIG. 5.

The connecting member 42 is received in the receiving hole such that the resisting members 422 are received in the receiving cavities and the anti-rotation members 421 are received in the receiving grooves. Simultaneously, the connecting member 42 is able to move along a longitudinal direction thereof and rotate relative to an axis thereof, thus yielding the portable electronic device 100 in FIGS. 5 and 6. In this state, the handle 41 is rotatable, thus enabling transport of the portable electronic device 100 as shown in FIGS. 5 and 6.

Figure 4:
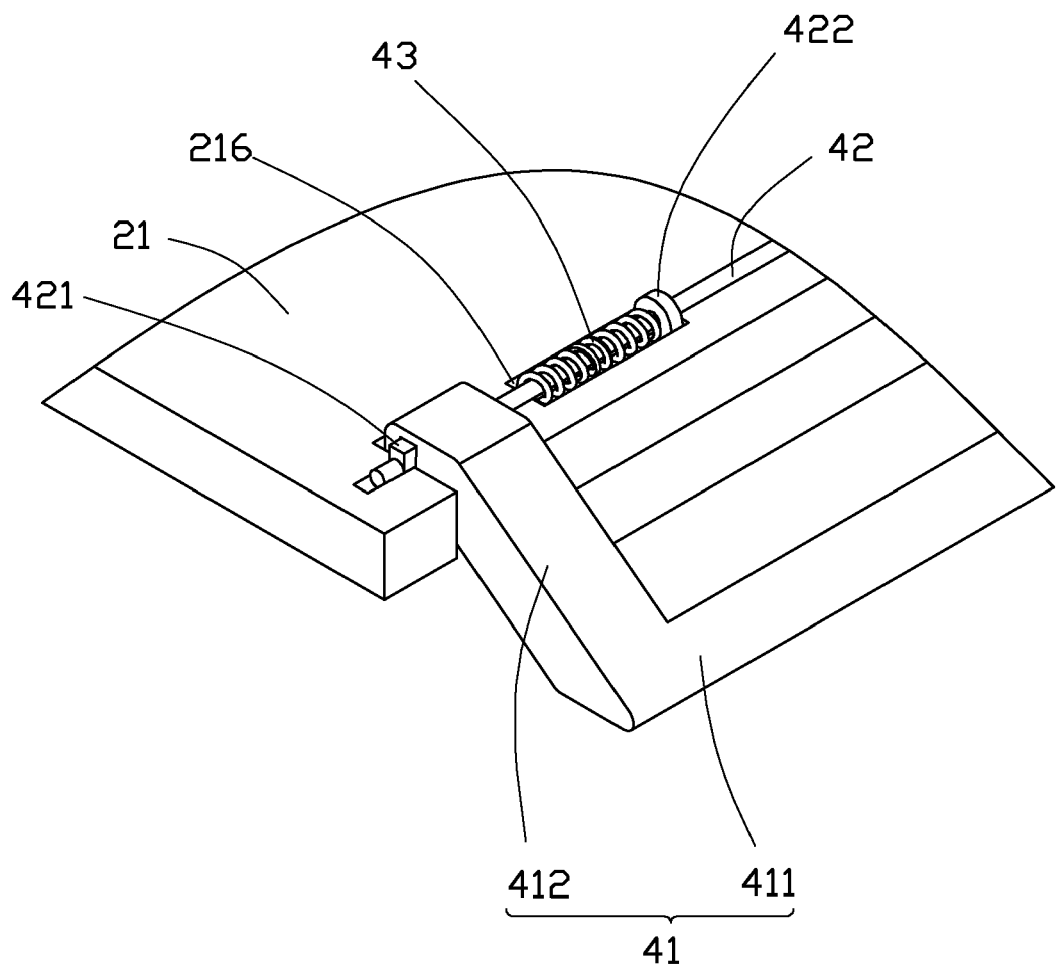
FIG. 4 is a partially enlarged view of the portable electronic device in FIG. 1.

Referring to FIGS. 1 and 4, a first external force is applied to rotate the handle 41. When the anti-rotation members 421 align with the anti-rotation holes, a second external force is applied to the second end 4023 of the connecting member 42 along a longitudinal direction thereof such that the anti-rotation members 421 are latched in the anti-rotation holes.

In this state, the connecting member 42 is non-rotatable relative to the main body 20 and the handle 41. Simultaneously, the handle 41 and the main body 20 cooperatively define an angle such that the main body 20 can be supported by the handle 41.

It can be understood that the elastic members 43 may be omitted.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. A portable electronic device, comprising:
   a main body defining two receiving grooves, an anti-rotation hole defined in a side wall of each receiving groove, and a receiving hole crossing the receiving grooves;
   a handle comprising a rod portion and two supporting portions extending from opposite ends of the rod portion, and an engaging groove defined in each supporting portion;
   a connecting member received in the receiving hole of the main body; and
   two anti-rotation members fixed to opposite ends of the connecting member, wherein the connecting member rotatably connects the main body to the handle; an end of each supporting portion of the handle is received in the corresponding receiving groove, the anti-rotation members are detachably latched in the engaging grooves of the handle and the anti-rotation holes of the main body such that the handle and the main body are non-rotatable relative to the connecting member and define an angle, whereby the handle supports the main body.

2. The portable electronic device of claim 1, wherein the main body comprises a first base plate and a second base plate positioned on the first base plate; each of the first base plate and the second base plate comprises a top surface and a bottom surface opposite to the top surface; each of the first base plate and the second base plate defines an elongated groove in the top surface thereof; the elongated grooves of the first base plate and the second base plate cooperatively define the receiving hole.

3. The portable electronic device of claim 2, wherein the first base plate and the second base plate both define two slots in the top surface respectively; the slots of the first base plate connect the top surface of the first base plate to the bottom surface of the first base plate; the slots of the second base plate do not connect the top surface of the first base plate to the bottom surface of the second base plate; the slots of the first base plate and the slots of the second base plate define the receiving grooves.

4. The portable electronic device of claim 3, wherein the elongated groove of the first base plate comprises an open end and a closed end opposite to the open end; the slots of the first base plate are adjacent to the open end and the closed end of the elongated groove of the base plate respectively.

5. The portable electronic device of claim 4, wherein each of the first base plate and the second base plate defines a notch in a sidewall of each slot; the notches of the first base plate and the second base plate cooperatively define two anti-rotation holes.

6. The portable electronic device of claim 5, wherein the two notches of the first base plate are in a side, adjacent to the closed end of the slots of the first base plate.

7. The portable electronic device of claim 6, wherein the notches are deeper than the elongated grooves.

8. The portable electronic device of claim 6, wherein the handle further comprises an elongated rod portion from opposite ends of which the supporting portions extend respectively; a through hole is defined in an end of each supporting portion; an engaging groove is defined in a periphery of each through hole; one engaging groove is in an inner side of one supporting portion, and another engaging groove is in an outer side of the other supporting portion; the supporting portions of the handle are received in the two slots of the first base plate such that the closed end of the elongated groove is adjacent to the engaging groove in the outer side of the corresponding supporting portion.

9. The portable electronic device of claim 2, further comprising two elastic members and two resisting members fixed to the connecting member, wherein the first base plate and the second base plate define two receiving depressions in the top surface thereof; the receiving depressions cross the elongated groove; the receiving depressions of the first base plate and the receiving depressions of the second base plate define two receiving cavities; the resisting members and the elastic members are received in the receiving cavities such that one end of the elastic members resists the resisting members and another end of the elastic members resists a periphery of the receiving cavities.

10. The portable electronic device of claim 9, wherein the resisting members are between the anti-rotation members.

11. The portable electronic device of claim 9, wherein each supporting portion is between one corresponding elastic member and one corresponding anti-rotation member.

12. The portable electronic device of claim 9, wherein the receiving depressions are wider than the elongated grooves.

13. The portable electronic device of claim 9, wherein the receiving depressions are deeper than the elongated grooves.

* * * * *